Figure 5C:
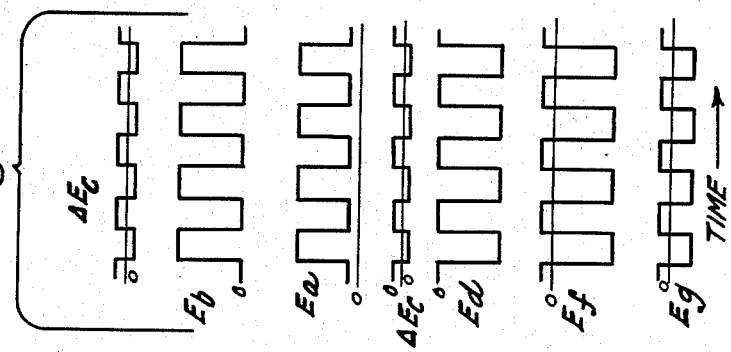

Aug. 17, 1954 L. E. NORTON 2,686,897
COMPENSATED TWO-CHANNEL SERVO SYSTEM
Filed Dec. 30, 1949 3 Sheets-Sheet 1
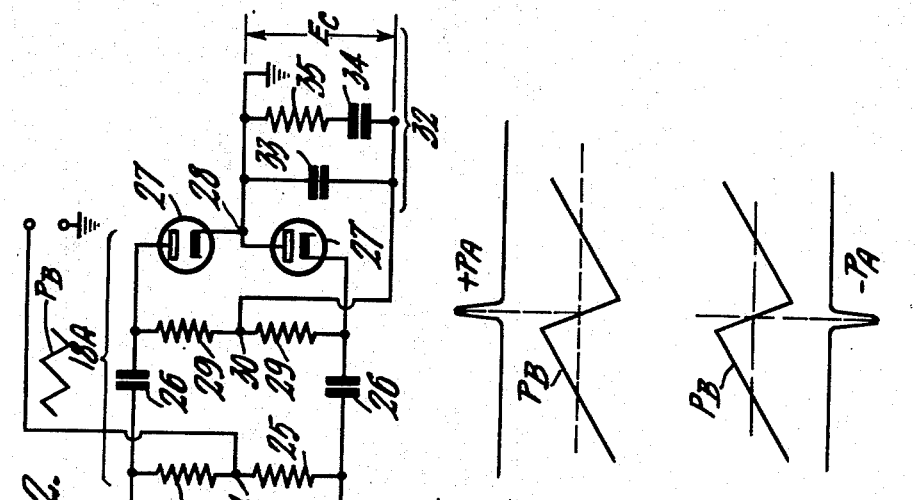
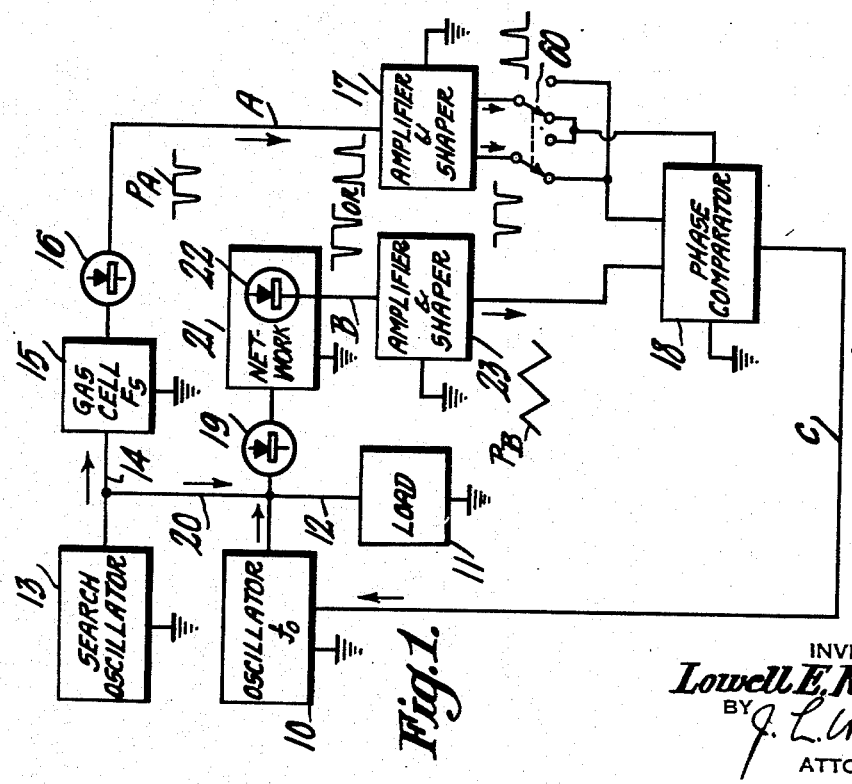
INVENTOR
*Lowell E. Norton*
BY
ATTORNEY

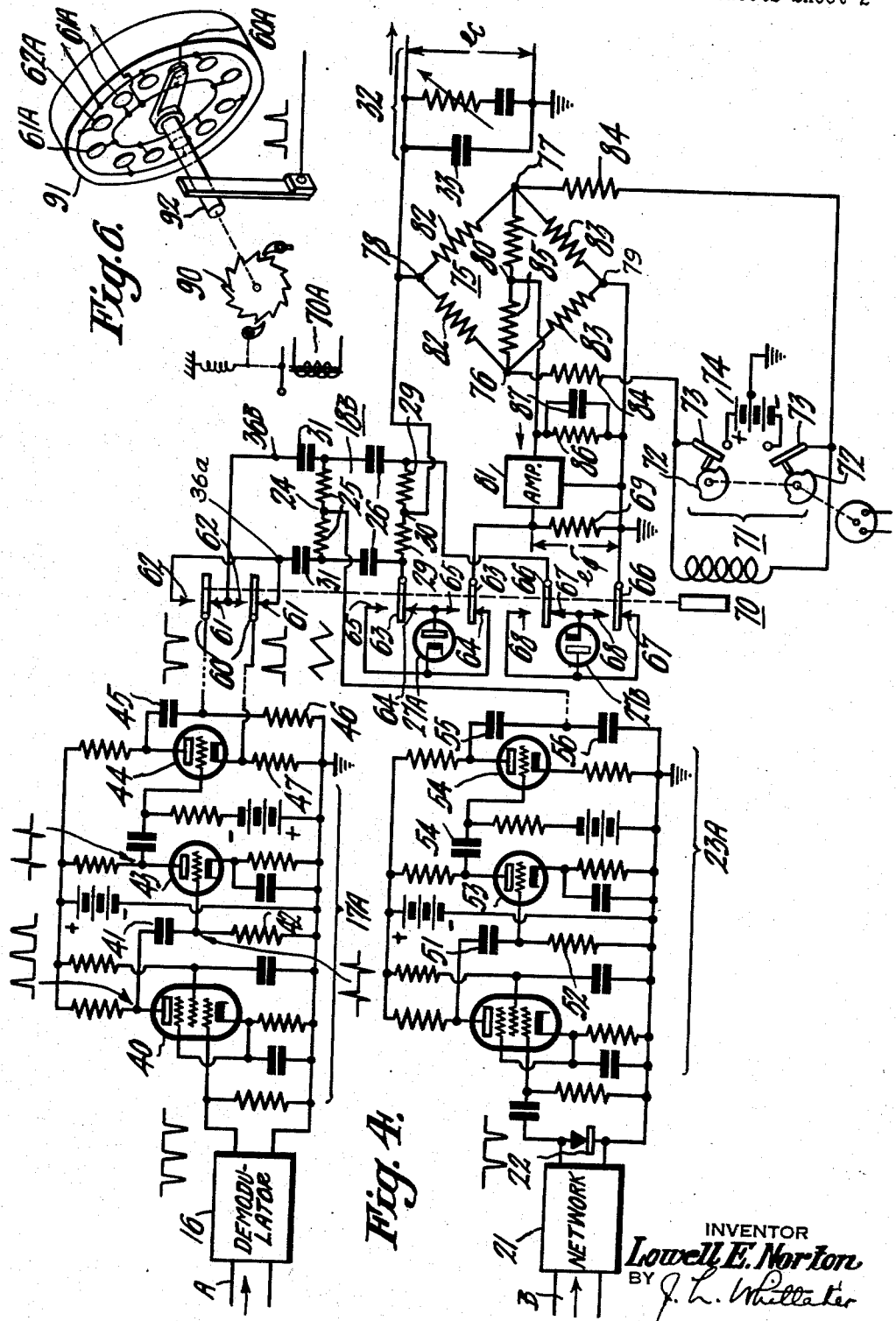

Aug. 17, 1954

L. E. NORTON 2,686,897

COMPENSATED TWO-CHANNEL SERVO SYSTEM

Filed Dec. 30, 1949

3 Sheets-Sheet 3

$E_a = m(E_b + \Delta E_c)$   $E_f = n(E_d + E_c)$   $E_g = m(E_a + E_f)$
$n, m$ ARE PROPORTIONALITY FACTORS INVENTOR
Lowell E. Norton
BY
ATTORNEY Patented Aug. 17, 1954

2,686,897

UNITED STATES PATENT OFFICE 2,686,897

COMPENSATED TWO-CHANNEL SERVO SYSTEM

Lowell E. Norton, Princeton, N. J., assignor to Radio Corporation of America, a corporation of Delaware Application December 30, 1949, Serial No. 135,857

8 Claims. (Cl. 324—87)

This invention relates to dual-channel servo systems such as utilized, for example, for frequency-stabilization of oscillators and particularly concerns arrangements for minimizing shift in the control point or set-point frequency due to differential changes in the two channels of the servo system.

In copending applications including Serial Nos. 115,698, 122,988 and 119,119, now, respectively, U. S. Patent Nos. 2,631,269; 2,560,365; and 2,555,150; and in applications Serial Nos. 29,836, now abandoned, and 4,497 there are disclosed frequency-stabilizing systems in which two trains of pulses containing frequency-error information are applied to input circuits of a phase-comparator or time-coincidence detector to produce a unidirectional output voltage varying in sense and magnitude with the phase relation of the pulses. By recourse to high gain or amplification in the servo system, the carrier-frequency of the controlled oscillator can be rigidly stabilized within very narrow limits: however, as the circuit parameters in the two channels may differentially change with time, ambient temperature or operating conditions, the output frequency will shift because the aforesaid differential changes affect the time or phase relation of the pulses indistinguishable by the detector from changes in phase due to frequency-deviation of the oscillator.

In accordance with the present invention, the connections of one of the input circuits of the comparator is intermittently reversed concurrently with reversal of the poling of reectifiers in the phase-comparator, so that without any change in poling of the output voltage, its magnitude is subject to an incremental change in sense and magnitude corresponding with any dissimilarity between the circuit components so transposed. More particularly, the incremental control voltage changes so produced are compared with a reference voltage produced by or timed with the switching operations and the algebraic sum of these voltages, or a voltage proportional thereto, is introduced into the comparator network as rectifier bias automatically to reset or maintain the control point or output frequency determined by the servo system.

The invention further resides in methods and systems having the features of combination and arrangement hereinafter described and claimed.

Figure 5B:
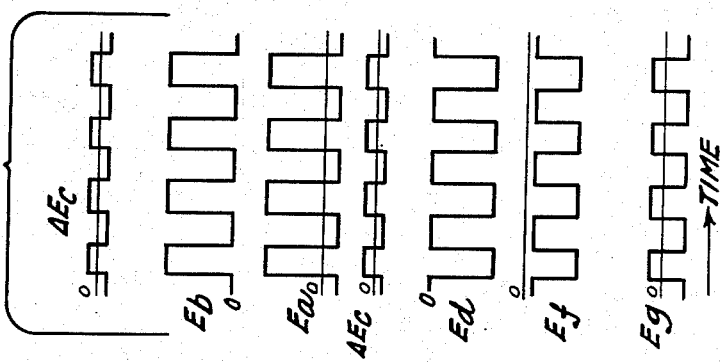
Figure 5A:
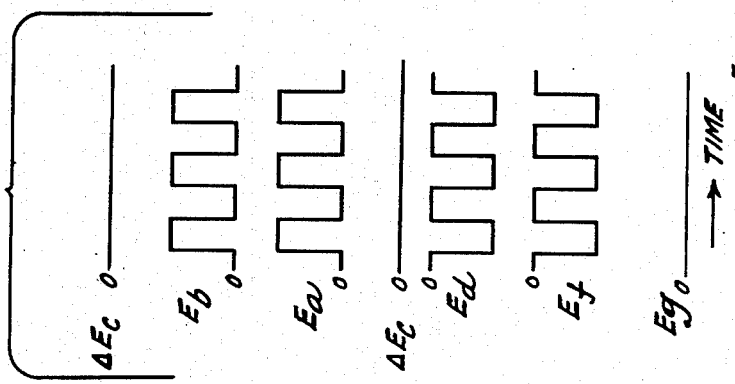

For a more detailed understanding of the invention, reference is made to the accompanying drawings in which:

Fig. 1 is a block diagram of the stabilized oscillator system;

Fig. 2 schematically illustrates a phase-comparator or coincidence-detector utilizable in Fig. 1;

Figs. 3A and 3B are explanatory figures referred to in discussion of Figs. 1 and 2;

Fig. 4 schematically illustrates a dual-channel servo system utilizable in the system of Fig. 1;

Figs. 5A, 5B and 5C are explanatory figures referred to in discussion of Fig. 4; and Fig. 6 illustrates a modification of switching mechanism shown in Fig. 4.

Referring to Fig. 1, the oscillator 10 to be stabilized at a frequency $F_0$ may supply high-frequency power to a load 11 through a suitable transmission line 12. For purpose of explanation, it will be assumed that oscillator 10 is a microwave oscillator and that it is desired to stabilize its frequency with respect to a standard frequency $F_s$ which may be that at which a gas exhibits molecular resonance.

The frequency of a second oscillator 13 is repeatedly swept over a range of frequencies including the standard frequency. Part of the output of the search oscillator 13 is transmitted through line 14 to a cell 15 containing, for example, ammonia, at suitably low pressure to exhibit sharp molecular resonance at the standard frequency. The microwave energy transmitted by the gas is impressed upon a demodulator 16 whose output therefor is a series of pulses each occurring as the search-frequency passes through the resonant frequency of the gas.

Part of the output of each of the oscillators 10 and 13 is impressed upon a suitable mixer 19, suitable directional couplers 20 being provided for that purpose. The output of the mixer 19, therefore, comprises a periodically varying beat-frequency equal to the difference between the frequencies of oscillators 10 and 13. Assuming, for example, that the frequency of oscillator 10 is nominally 23.900 kilomegacycles and that the frequency of oscillator 13 is repeatedly swept over the range from 23.867 to 23.872 kilomegacycles, the difference-frequency output of mixer 19 cyclically varies over the range of from 33 to 28 megacycles. The repetition or sweep rate of the oscillator 13 is relatively low, for example 100 kilocycles, but is substantially higher than the frequency of any modulation applied to oscillator 10 for transmission of intelligence at audio or video frequencies.

The beat-frequency output of the demodulator 19 is impressed upon a frequency-selective network 21 including or associated with a rectifier or demodulator 22 which like demodulator 16 and mixer 19 may be of the crystal type. The network 21 may include sharply tuned circuits or other types of filters, such as disclosed in the aforesaid applications. Generically in all of them, the output of the demodulator 22 is a series of pulses containing information concerning the precise time in the sweep cycle at which the beat-frequency passes through a prechosen value $F_B$.

As more fully set forth in the aforesaid applications, the two trains of pulses, one produced by impressing the search-frequency upon the gas cell 15 or equivalent and the other by impressing the periodically varying beat-frequency upon the frequency-selective network 21, are impressed, after suitable amplification and shaping by networks 17 and 23, upon a phase-comparator 18 of suitable type. Also as therein explained, the output of the phase-comparator is a unidirectional voltage which varies in sense and magnitude with variations in the time relations between the corresponding pulses of the two trains. The control voltage so produced is applied to the oscillator or a tube associated therewith to stabilize its output frequency at the frequency which corresponds with the standard-frequency $F_S$ plus or minus the prechosen beat-frequency $F_B$ selectively passed by network 21.

The system of Fig. 1 thus briefly described is typical of a two-channel servo system whose output or correction-voltage, under ideal conditions, is determined solely by the phase relation of the input voltages applied to the phase-comparator. Actually and inevitably, there arise dissimilarities in the two channels, such, for example, those due to the effects of temperature and other ambient conditions upon the circuit components including condensers, resistors and tubes of the phase-comparator. In consequence, zero output of the phase-comparator may occur not at the expected coincidence of the two trains of pulses but at a somewhat earlier or later time, with the result that the oscillator is stabilized at a frequency which is somewhat displaced from the desired output frequency.

In accordance with the present invention, the connections from one of the channels, specifically channel A, to the phase-comparator 18, may be reversed, as indicated by switch 60, Fig. 1, so that for one position of the switch the servo system tends to stabilize the oscillator frequency at or somewhat above the desired frequency, whereas for the other position of the switch, the servo system will tend to stabilize the oscillator-frequency at or somewhat lower than the desired frequency depending upon the sense of the net differential changes. Thus, by reversing the input connections at suitably short intervals, the integrated frequency-error may be reduced. The foregoing presupposes, as later more fully discussed, that provision is made to reverse the poling of rectifiers included in the phase-comparator concurrently with the aforesaid switching so that the incremental change in output-voltage of the comparator corresponds only with the dissimilarities between the two transmission paths in channel A and does not depend upon the frequency-deviation of oscillator 10. Such periodic reversal is itself of value, but alone does not provide for an absolute output frequency. To attain that end, the incremental change of output occurring upon switching of the input channel is reintroduced into the phase-comparator network in compensation for the differential changes in channel constants or operating parameters, so automatically to maintain the proper set-point frequency despite dissimilarities between channels of the servo system.

Although the invention is applicable to phase-comparators of many different types, the one shown in Fig. 2 is selected for description of a specific example and also to give a clearer understanding of the foregoing statements. The output pulses of the frequency-selective network 21 are converted to pulses of sawtooth waveform $P_B$ applied to the input terminal 24 of the phase-comparator 18A. The path within the comparator from input terminal 24 to the anode of the upper rectifier 27 includes a resistor 25 and a blocking condenser 26; the path from input terminal 24 to the cathode of the other rectifier 27 includes a similar series-arrangement of a resistor 25 and a condenser 26. One of the output terminals 28 of the phase-comparator 18A is connected between cathode and anode of the upper and lower rectifiers 27 respectively; the other output terminal 30 is the mid-point or common terminal of equal resistors 29 connected in shunt to the two rectifiers. The output terminals of the phase-comparator 18A are connected to a resistance-capacitance network 32 which smooths the pulsed output of the phase-comparator to provide the frequency control voltage $E_C$. As indicated in Fig. 2, the pulses $P_B$ are applied in phase (push-push) to the two rectifiers 27 which, so far as these pulses are concerned, are oppositely poled, the upper rectifier 27 conducting for positive peaks of pulses $P_B$ and the lower rectifier 27 conducting for negative peaks of those pulses.

The pulses of channel A are converted as later specifically described to pairs of positive and negative pulses $(+P_{A1}-P_A)$ which are applied in push-pull through blocking condensers 31, 31 to the rectifiers 27, 27 in series-aiding relation.

The output of the phase-comparator network 18A is zero when, as indicated in Figs. 3A and 3B, the push-pull pulse pairs of channel A occur or are at peak value when the trailing edge of the sawtooth voltage $P_B$ passes through its mean value. Under such circumstance, the current pulses passed by the rectifiers in each cycle are equal in magnitude and opposite in polarity so that their average value is zero and consequently there is no change of the control voltage $E_C$ of the integrating network 32 for the compaartor. Zero output of the phase-comparator per sweep cycle of oscillator 13 should exist only under the circumstance that the frequency of oscillator 10 precisely corresponds with the sum of the standard frequency $F_S$ plus or minus the pass-frequency $F_B$ of network 21, depending upon which output frequency is desired. Should, however, the positive and negative pulses $(+P_A-P_A)$ be not quite alike in amplitude, due to differential impedance variations in the associated networks or to any other cause, or should the two diodes 27, 27 have slightly different contact potentials, then zero output of the phase-detector occurs not at the expected coincidence condition but at a point displaced in time or phase therefrom, the sense of the displacement, depending upon which of the pulses is of greater amplitude. These are but two examples of many dissimilarities whose net effect may cause an error in the output frequency of the frequency-stabilizing servo system.

The phase-comparator 18B of Fig. 4 is the same as that of Fig. 2 except in novel respects specifically discussed. The connections from channel A to the input terminals 36, 36 of the phase-comparator 18B include a reversing switch for transposing the connections so that with each reversal the positive components traverse the path previously traversed by the negative pulses, and vice versa. Specifically, with the movable switch contacts 60, 60 in the position shown, the positive pulses +P$_A$ are transmitted to input terminal 36A and the negative pulses —P$_A$ are impressed upon input terminal 36B. When the contacts 60, 60 are moved out of engagement with contacts 61, 61 and into engagement with contacts 62, 62, the positive pulses +P$_A$ are impressed upon input terminal 36B and the negative pulses upon input terminal 36A. Concurrently with this transposition of the conductors of channel A, the movable contacts 63, 63 of a second switch move from engagement with contacts 64 and into engagement with contacts 65 to reverse the poling of rectifier 27A, and the contacts 66, 66 of a third switch similarly coact with fixed contacts 67, 68 to reverse the poling of the other rectifier 27B. Thus, upon each actuation of the reversing switches, the paths of channels through the comparator of the push-pull pulses +P$_A$, —P$_A$ are transposed. If the same phase relations of the pulses exist for both positions of the reversing switches, the incremental change in the output voltage of the rectifier is zero, whereas if there are dissimilarities between the two channels, the switching operations will cause incremental voltage changes to values above or below the value corresponding with the proper output frequency, all as indicated by the curve ΔE$_c$ of Figs. 5A, 5B and 5C.

In the particular arrangement shown in Fig. 4, the reversing switches are periodically actuated by an electromagnetic relay device 70 under control of a timing switch 71 which may comprise motor-driven cams 72 and contacts 73 actuated thereby to complete a circuit through battery 74, or equivalent source of current. The reversals are effected at suitably short intervals, for example, every one or two seconds.

For detecting the sense and magnitude of the incremental voltage changes incident to switching of the channel connections, there is required a source of reference, which in the arrangement shown in Fig. 4 is provided by or derived from the switching.

Specifically, the switches 73, 73 also control flow of current through a resistance network 75 having input terminals 76, 77 respectively connected through resistor 84 and switch 73 to opposite terminals of the battery 74. The input terminals 76, 77 are also connected through equal resistors 83, 83 to the center tap of battery 74 which is at ground or chassis potential. The input terminals 76, 77 are also connected through equal resistors 85, 85 to the output terminal 80 of the network 75.

The output voltage of the phase-comparator network 18B is applied to the input terminals 78, 79 of the resistance network 75, the resistors 82, 82 connected from terminals 78 to each of terminals 76, 77 being of equal value. The output voltage of the resistance network 75 is impressed upon a network comprising the resistor 86 and condenser 87 in shunt thereto. The time constant of 86, 87 is only large enough at the switching period to prevent overshoot switching transients from appearing at amplifier 81 input. The resistors 82, 84 are of equal magnitude, which is large compared to the resistance of each of the equal resistors 83, 83. The magnitude of the equal resistors 85, 85 is very large compared to that of resistors 86 and 83.

The successive reversals of switches 60, 63 and 66 in unison produce incremental changes of the output voltage of the comparator, assuming uncompensated differential changes, which are applied to input terminals 78, 79 of the network 75. These incremental voltage changes may be positive, in a phase sense as indicated in Fig. 5B, or negative (in the opposite phase) as indicated in Fig. 5C. The successive closures of switches 73 produce two intermittent voltages E$_b$ and E$_d$, which are of opposite sense or phase and of equal magnitude and jointly serve as a reference across resistors 83, 83 of network 75. Assuming the incremental comparator output pulses are of one sense, Fig. 5B, the peak value of the algebraic sum E$_a$ of the voltages E$_b$ and ΔE$_c$ as measured at output terminals 79, 80 of network 75 is greater than the algebraic sum E$_f$ of the voltages E$_d$ and ΔE$_c$ as independently measured at the same output terminals and consequently the difference E$_g$ of these sums as applied to the integrating RC network is positive in sense (Fig. 5B).

If on the other hand, Fig. 5C, the incremental voltage changes ΔE$_c$ are negative in sense, the peak value of the algebraic sum E$_a$ is less than the algebraic sum E$_f$ and the output difference voltage E$_g$ of network 75 is negative in sense.

In both cases, the output voltage E$_g$ of network 75 is proportional to ΔE$_c$ and of corresponding sense.

The pulsing output voltage E$_g$ of network 75 is slightly smoothed by the averaging network 86, 87 to prevent overshoot switching transients form appearing in amplifier 81 input and applied to a direct-current amplifier 81 whose output resistance 69 is connected between the rectifiers 27, 27 to provide a bias which shifts the operating point of the rectifiers in proper sense and to proper extent to reduce the incremental changes ΔE$_c$ of the comparator output voltage to negligible or zero value, Fig. 5A thus to insure that the output frequency of the stabilizing system remains the same despite differential changes in the servo-system channels for pulses +P$_A$, —P$_A$. The incremental changes are thus fed back in such a sense, to the rectifier circuit of tube 27A that such incremental changes are substantially cancelled or compensated.

It is not necessary, of course, that the switches for reversing the channel connections and poling of the rectifiers 27, 27 be of reciprocating type. The switches may be of the rotating type or may be electronic. As exemplary of the former, reference is made to Fig. 6, in which the timing solenoid 70A through a stepping mechanism 90 intermittently rotates shaft 92 to which are attached the movable contacts of the reversing switches. Each movable contact, generically represented by contact 60A of Fig. 6, alternately engages fixed contacts, exemplified by contacts 61A, 62A of the reversing switch. As exemplary of an electronic switch which can be used for reversing the channel connections and rectifier poling, reference may be had to pages 300 to 301 of "The Electronic Engineering Handbook" by Batcher and Moulic, Edition 1945, published by Maple Press Co. for Electronic Development Associates.

The pulses are applied in channel A to demodulator 16 and amplified by an amplifier 40, then differentiated by a capacitor-resistor combination comprising capacitor 41 and resistor 42.

The amplifier 44 is normally biased to be cut-off, and this bias is overcome only at the positive peaks of the differentiated and amplified pulses. The amplifier 44 also serves as a phase inverter to supply an output of one phase from the anode circuit through coupling capacitor 45, and an output of the opposite phase developed across cathode resistor 47. Resistor 46 is, for the A. C. circuit, in parallel with the anode resistor, so that the tube current develops equal amplitude pulses across the anode and cathode load circuits.

In channel B of Fig. 4, network 21 with rectifier 22 demodulates pulses which are amplified in a first stage of amplification, then applied by a differentiating circuit comprising capacitor 51 and resistor 52. The differentiated and amplified pulse is applied to amplifier 54 through coupling capacitor 54. Amplifier 54 is normally cut-off, only the peaks of the amplified differentiated signal causing conduction in amplifier 54. The purpose of this, as in amplifier 44, is set more definitely than the broad input pulses the time of occurrence of the output pulses. From amplifier 54, the output is taken from the junction between two capacitors 55 and 56 connected serially between the anode of the amplifier 54 (which has a load resistor as shown). The output therefore is of saw-tooth form as illustrated by the wave shape adjacent the lead to junction 24.

It will be understood that the outputs of channels A and B are to be brought into a desired phase coincidence as described in connection with Figs. 3A and 3B. The effect of contact potentials and the like to cause unbalance in the phase detected output from junction 30 has already been described in connection with Fig. 2, and the manner in which such unbalance and the corresponding error is corrected has already been described. Such correction is secured by the feed-back through amplifier 81 which substantially nullifies the undesired voltage introduced by such unbalance.

Though particularly suited for use in frequency-stabilizing systems of the type described, it shall be understood the invention is suited for fixing the control point of dual channel servo systems used for other purposes.

What is claimed is:

1. The combination with a two-channel frequency-stabilizing servo-system one channel producing push-pull and the other push-push signals, said system being of type in which a phase-comparator includes rectifier means producing a frequency-control voltage varying with and having a sensing responsive to the phase relation of error pulses respectively impressed one in push-pull and one in push-push by said channels upon said comparator, and an arrangement for minimizing frequency error due to dissimilarities between nominally similar components of said channels, said arrangement comprising first switching means for reversing the connections of one of said channels to the phase-comparator and second switching means for concurrently reversing the poling of said rectifier means, and means for repetitively actuating said switching means simultaneously, whereby the average value of said frequency-control voltage is insensitive to channel unbalance.

2. The combination set forth in claim 1 with addition of means for combining a reference potential with incremental changes of said frequency-control voltage to produce a potential of magnitude and sense corresponding with the frequency-error due to aforesaid parameter differences of the channels.

3. The combination set forth in claim 2 with addition of means for introducing said produced potential into said phase-comparator in sense to reduce said incremental changes in frequency-control voltage to negligible magnitude.

4. A phase-comparator including rectifier means and having two input channels one applying push-pull and the other push-push, signals to said rectifier means and an output channel, a modulator network in said output channel, first switching means for intermittently reversing the connections of one of said input channels and second switching means for concurrently reversing the poling of rectifier means in said phase-comparator to apply to said network incremental voltage changes corresponding with differential dissimilarities of said comparator circuit components, and means for effectively introducing the output of said modulator network into said phase-comparator as a compensating bias for said rectifier means.

5. A phase-comparator as in claim 4 in which a reference voltage applied to said network is varied in synchronism with the switching.

6. A phase comparator network having a pair of output terminals and two pairs of input terminals, means to apply push-pull signals to one pair of said input terminals, and means to apply push-push signals to the other said pair of input terminals, a pair of rectifiers connected in series aiding relationship to receive said signals, a pair of components, nominally similar but actually having dissimilarities, one said component connected in circuit between one rectifier and one pair of input terminals and the other said component in circuit similar to the one between the other rectifier and the other pair of input terminals, the voltage between said output terminals being of magnitude and sense dependent on the phase relationship of signals applied to said pairs of input terminals, and also upon dissimilarities of said components and rectifiers, and means for minimizing the effect of said dissimilarities upon said output voltage, said minimizing means comprising switching means for intermittently reversing the signal connections to said one pair of input terminals, and switching means for reversing the poling of said rectifiers concurrently with the said reversing of connections to said input means.

7. A system as claimed in claim 6, in which the said output connections are connected into the said network to reintroduce into said phase comparator a voltage which substantially completely compensates for dissimilarities in said rectifiers.

8. In a two-channel frequency-stabilization servo-system of the type in which the phase of push-pull pulse signals from one channel are compared with push-push signals from the other channel in a phase comparator which includes a pair of rectifier means connected to receive said signals, poled one to produce a rectification voltage in one sense of the push-push signal with pulses of one polarity superimposed thereon, and the other rectifier means poled to produce a rectification voltage in the opposite sense of the push-push signal with pulses of the other polarity superimposed thereon, said pair of rectifier means being interconnected to have as an output the differential voltage with sensing of the rectification voltages; an arrangement for minimizing frequency error due to dissimilarities between nominally similar components of said channels, said arrangement comprising first switching means for reversing the connections of said one channel to apply said push-pull signals in reverse polarity, second switching means to reverse the poling of said rectifier means, and means for simultaneously and repetitively actuating said switching means.

References Cited in the file of this patent

UNITED STATES PATENTS

| Number | Name | Date |
|---|---|---|
| 2,093,512 | Bowen | Sept. 21, 1937 |
| 2,288,310 | Zuschlag | June 30, 1942 |
| 2,406,125 | Ziegler et al. | Aug. 20, 1946 |
| 2,464,818 | Learned | Mar. 22, 1949 |
| 2,551,291 | Rich | May 1, 1951 |